United States Patent [19]

Birkeland

[11] 4,455,076
[45] Jun. 19, 1984

[54] FILM SUPPLY CASSETTE FOR CAMERA PROCESSOR

[75] Inventor: Stephen P. Birkeland, White Bear Lake, Minn.

[73] Assignee: Minnesota Mining & Manufacturing Company, St. Paul, Minn.

[21] Appl. No.: 417,058

[22] Filed: Sep. 13, 1982

[51] Int. Cl.³ .............................................. G03B 17/26
[52] U.S. Cl. .................................. 354/275; 242/71.1; 352/235; 430/501
[58] Field of Search .............. 354/275; 242/71.1, 71.8; 352/235, 92, 241; 430/501

[56] References Cited

U.S. PATENT DOCUMENTS

| | | |
|---|---|---|
| 1,454,812 | 5/1923 | Jones . |
| 1,454,814 | 5/1923 | Jones . |
| 1,454,815 | 5/1923 | Jones . |
| 1,454,816 | 5/1923 | Jones . |
| 1,454,817 | 5/1923 | Jones . |
| 1,575,804 | 3/1926 | Van Derhoef . |
| 1,605,841 | 11/1926 | Jones . |
| 1,665,481 | 4/1928 | Slocum . |
| 1,687,048 | 10/1928 | Van Doorn . |
| 1,687,066 | 10/1928 | Haste . |
| 1,687,100 | 10/1928 | Lovejoy . |
| 1,900,879 | 3/1933 | Jones . |
| 2,606,409 | 8/1952 | Gordon ............................ 352/235 |
| 3,647,465 | 3/1972 | Shamay . |
| 3,660,153 | 5/1972 | Yoshihiro . |
| 3,795,439 | 3/1974 | Brown et al. ..................... 352/241 |
| 3,893,880 | 7/1975 | Cook ................................. 352/92 |
| 3,986,879 | 10/1976 | Klinkhammer . |

FOREIGN PATENT DOCUMENTS

| | | |
|---|---|---|
| 394681 | 8/1923 | Fed. Rep. of Germany . |
| WO80/01960 | 9/1980 | PCT Int'l Appl. ............... 354/275 |
| 356981 | 9/1931 | United Kingdom . |

*Primary Examiner*—A. A. Mathews
*Attorney, Agent, or Firm*—Donald M. Sell; James A. Smith; John C. Barnes

[57] ABSTRACT

A film supply cassette comprising a hub, axially spaced end flanges, a trailer secured to the hub having an opening to cooperate with a sensor, a length of light-sensitive film convolutely wound about said trailer, and a leader comprising a vapor coated polyethylene/polyester laminate bonded to paper and wrapped about the film between the flanges and being wider than the film.

5 Claims, 4 Drawing Figures

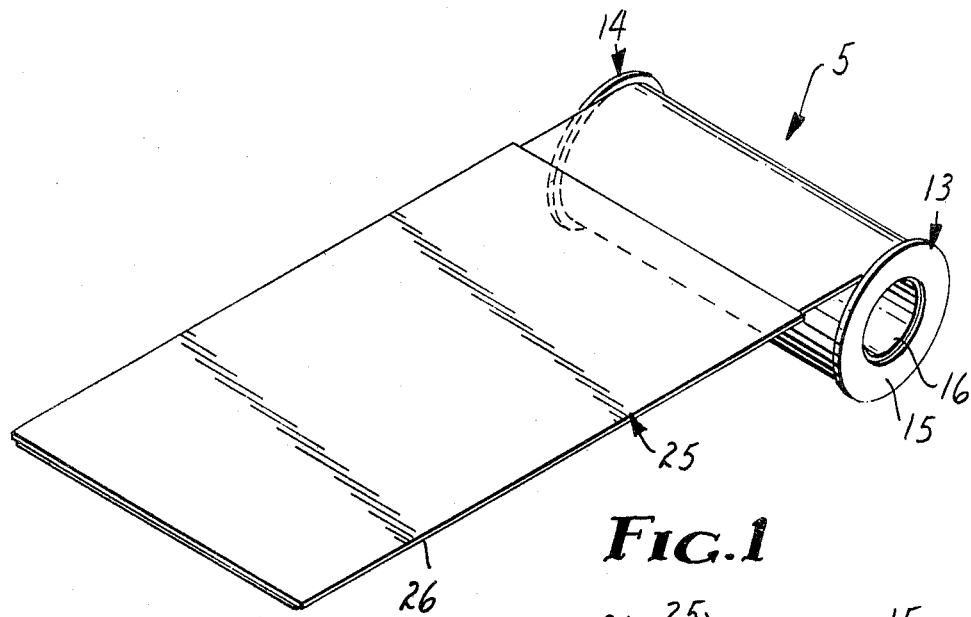
FIG.1
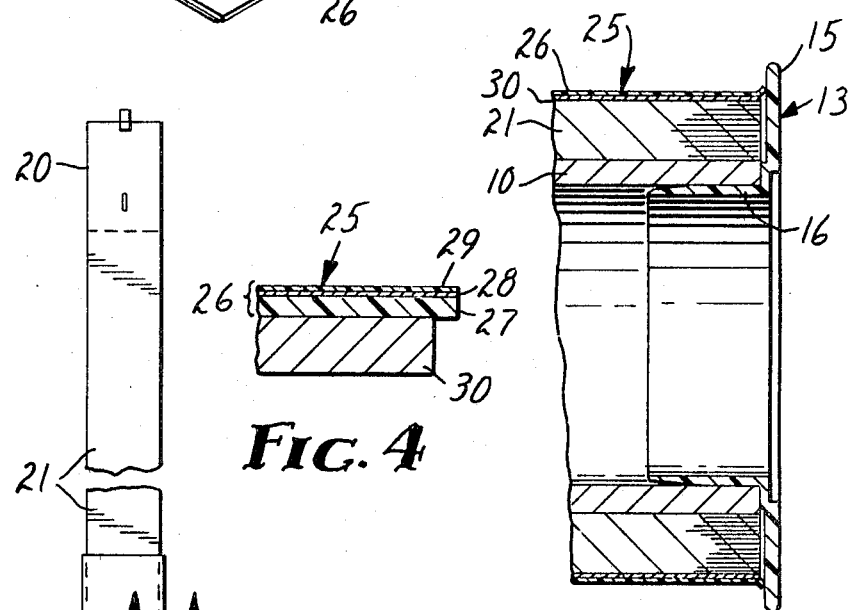
FIG.4
FIG.2
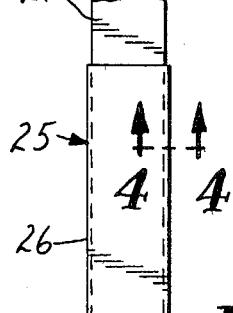
FIG.3

FILM SUPPLY CASSETTE FOR CAMERA PROCESSOR

DESCRIPTION

1. Technical Field

This invention relates to a supply cassette for supplying light-sensitive photographic material to a camera, permitting daylight loading of the camera, and in one aspect, to an improved film cassette wherein a leader on the supply roll protects the light-sensitive film material from ambient light.

2. Background Art

It has been known for years to provide cassettes of photographic film in roll form for use in cameras. It is also well known that the film may be wrapped with a protective paper. One early patent concerning the wrapping of the film with a protective paper is U.S. Pat. No. 1,454,812, issued July 25, 1921. In this patent the patentee illustrates that it is possible to have protective paper wrapped about the film in such a way that it can be used with the spools having flat end flanges, and that without introducing an objectionable degree of friction or pressure between the protective paper and the flanges, the paper can be positioned between the flanges to protect the film. As improvements in the materials were made, additional structures were proposed such as shown in U.S. Pat. No. 1,454,815, issued May 8, 1923, wherein further attempts were made to improve the light seal such as by scalloping the edges of the end strip 10. Later in still trying to solve the problem, the leader band was changed to comprise a strip of paper having on one surface a layer of unsensitized gelatin and on the other surface a layer of wax, note U.S. Pat. No. 1,687,066, issued Oct. 9, 1928.

Progress went on, and U.S. Pat. No. 3,660,153, issued May 1, 1972, disclosing a light-intercepting composition comprising an eythlene vinyl acetate copolymer having dispersed therein carbon black to intercept the light, and this film was laminated to a paper to provide a protective leader for a roll of photographic light-sensitive film.

The use of specialized films is not cost-effective, and does not provide the assurance of a thin flexible vapor-coated material as proposed by applicant for use in combination with a paper as a stiffener to provide a light shield formed between the opposed surfaces of the film core flanges.

DISCLOSURE OF INVENTION

The present invention provides a cassette for a photographic light-sensitive roll of film which comprises a light-sensitive coating on either a paper material or on a polymeric film to protect the photosensitive layer from exposure to light before use. The film supply cassette of the present invention comprises a hub having a pair of axially spaced flanges to which is secured a trailer which is wound about the hub, a length of the photographic film is connected to the free end of the trailer and is convolutely wound about the hub and between the flanges. A leader is connected to the free end of the film which comprises a metal coated polyethylene film, polyester film laminate bonded to a stiff leader paper which laminate is between 4 and 6 mm wider than the paper or photographic film, and has a width greater than the spacing between the opposed inner surfaces of the cassette flanges.

BRIEF DESCRIPTION OF DRAWINGS

The present invention will be further described with reference to the accompanying drawing wherein:

FIG. 1 is a perspective view of a photographic film cassette constructed in accordance with the present invention;

FIG. 2 is an enlarged vertical sectional view of one end of the cassette;

FIG. 3 is plan view of an unrolled film cassette equipped with the trailer, film and leader according to the present invention, the scale being broken; and FIG. 4 is a detail sectional view taken along the lines 4—4 of FIG. 3.

BEST MODE FOR CARRYING OUT THE INVENTION

The photographic film cassette of the present invention comprises a spool 5 comprising a paper cylinder 10 defining the hub of the spool and a pair of end flanges defined by a pair of cores 13 and 14 formed of opaque polymeric material and having flange portions 15 which are secured to hub sections 16, as illustrated in FIG. 2. The hub sections 16 are generally cylindrical in shape and are tapered to be forced into the ends of the paper hub 10.

Wound on the hub is a trailer 20 formed of material which is approximately 432 mm long and is formed with an elongate opening which is 16 mm wide and about 60 mm long, to provide a microswitch sensing slot to signal the end of the film supply. This trailer 20 is secured by a length of tape to the hub 10. The trailer 20 may comprise a portion of the film, but in any event, is connected to the end of the photographic film 21 which may comprise a paper stock coated with a light-sensitive photographically developable coating, or transparent film material coated with a photosensitive coating. This light-sensitive film 21 is approximately 22 meters long and is convolutely wound on the hub 10 between the opposed surfaces of the flanges 15.

A leader 25 is connected to the free end of the photographic film material 21 and this leader comprises a metalized laminate film 26 which is bonded to a stiff leader paper 30. The laminate film 26 comprises a layer 27 of black opaque polyethylene of 0.11 mm, having an aluminum vapor-coating 28, which coating is covered by a thin film 29 of polyester, 0.013 mm thick. The laminate 26 thus has a thickness of 0.12 mm. This laminate 26 is then bonded by heat and pressure to a kraft paper 30 which has a thickness of 0.25 mm and which is sufficiently flexible to be convolutely wound 2 to 3 times about the photosensitive film 21 between the opposed inner surfaces of the spool flanges 15. The laminate 26 is between 4 and 6 mm wider than the film 21 or the paper 30 to engage the inner surfaces of the reel flanges to form a light-tight barrier to protect the unexposed photographic film 21 prior to use. The film 26 forming the leader is between 284.5 mm and 302.5 mm in width, each representing a preferred dimension depending on the width of film used, that is whether it be 279 or 297 mm wide.

The paper core 10 has an outside diameter of 90 mm, and with 0.25 mm film base, the roll circumference is 124 mm for light sensitive paper and 116 mm for light-sensitive film, which means the leader 25 must have a minimum of 980 mm in length to adequately wrap the film to give it light protection. The leader 25 is flexible and has a width greater than the film 21 to maintain the light seal against both the right and left flange of the spool. The spacing between the opposed surfaces of the reel flanges is equal to the width of the light sensitive material as the cores 13 and 14 are placed on the cylinders after the film material is wound thereon.

What is claimed is:

1. A film supply cassette comprising a support spool formed of opaque material and comprising a hub, a pair of end flanges, and hub sections for rotatably supporting the hub,
    a trailer secured to the hub and wrapped about the hub,
    a length of light sensitive film having one end connected to the trailer and convolutely wound upon itself, and
    a leader, formed of a laminate having a thickness of about 0.12 mm comprising a length of metal vapor-coated polyethylene film and a thin film of polyester, secured to the free end of the light-sensitive film and convolutely wound about the light-sensitive film between two and three times, said laminate having a width of 4 to 6 mm greater than the width of the light-sensitive film and greater than that of the spacing between the inner opposed surfaces of the end flanges and sufficiently thin to engage said opposed surfaces to form a seal between the flanges to restrict light from reaching the light-sensitive film.

2. A film cassette according to claim 1 wherein said laminate is laminated to a length of paper to increase the rigidity of the leader to permit the same to be threaded through a camera.

3. A film cassette according to claim 1 wherein said trailer is formed with an opening disposed centrally of the width thereof for cooperating with a sensing device.

4. A film supply cassette comprising
    an opaque support spool comprising a hub, a pair of end flanges, and hub sections for rotatably supporting the hub,
    a trailer secured to the hub and wrapped about the hub,
    a length of light-sensitive film having one end connected to the trailer and convolutely wound upon itself, and
    a leader, comprising a metalized opaque film and a length of paper, secured to the free end of the film and convolutely wound about said light-sensitive film, said metalized film comprising a length of vapor-coated polyethylene film 0.11 mm thick laminated to a 0.012 mm thick polyester film, and said metalized film is bonded to said length of paper which is 0.25 mm thick, the paper has a width corresponding to the light-sensitive film and a length to wrap convolutely about the light-sensitive film between 2 and 3 times and said metalized film has a width of between 4 and 6 mm greater than that of said light-sensitive film and greater than that of the spacing between the inner opposed surfaces of the end flanges to engage said opposed surfaces to form a seal between the flanges to restrict light from reaching the light-sensitive film.

5. A film cassette according to claim 4 wherein said trailer is formed with an opening disposed centrally of the width thereof for cooperating with a sensing device.

* * * * *